United States Patent
Oguri et al.

(10) Patent No.: US 7,769,262 B2
(45) Date of Patent: Aug. 3, 2010

(54) OPTICAL COMPRESSOR AND ULTRA-SHORT PULSE LIGHT SOURCE

(75) Inventors: Atsushi Oguri, Tokyo (JP); Shunichi Matsushita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/135,657

(22) Filed: Jun. 9, 2008

(65) Prior Publication Data

US 2009/0016669 A1 Jan. 15, 2009

Related U.S. Application Data

(63) Continuation of application No. PCT/JP2006/324557, filed on Dec. 8, 2006.

(30) Foreign Application Priority Data

Dec. 9, 2005 (JP) .............................. 2005-356262

(51) Int. Cl.
*G02B 6/00* (2006.01)
*H04J 14/02* (2006.01)
*H01S 3/00* (2006.01)

(52) U.S. Cl. ..................... 385/122; 385/11; 385/27; 359/333; 398/80; 398/81

(58) Field of Classification Search ............... 385/11, 385/122; 359/326, 333, 341.31, 341.1, 337.5; 398/80–81
See application file for complete search history.

(56) References Cited

U.S. PATENT DOCUMENTS 5,696,782 A * 12/1997 Harter et al. .................. 372/25
5,818,630 A * 10/1998 Fermann et al. ........ 359/341.31
6,014,249 A * 1/2000 Fermann et al. .......... 359/341.1
6,920,263 B2 * 7/2005 Tadakuma et al. ............ 385/27
7,330,301 B2 * 2/2008 Harter ......................... 359/333
7,436,866 B2 * 10/2008 Vaissie et al. .................. 372/27
2006/0002715 A1 1/2006 Igarashi et al.

FOREIGN PATENT DOCUMENTS

| JP | 7-218936 | 8/1995 |
|---|---|---|
| JP | 10-213827 | 8/1998 |
| WO | WO 2004/049054 A1 | 6/2004 |

* cited by examiner

*Primary Examiner*—Brian M. Healy
*Assistant Examiner*—Guy G Anderson
(74) *Attorney, Agent, or Firm*—Oblon, Spivak, McClelland, Maier & Neustadt, L.L.P.

(57) ABSTRACT

Provided is an ultra-short pulse light source having an optical pulse generator 111 for emitting short pulse light, an optical amplifier 112 for amplifying the short pulse light output from the optical pulse generator 111 and an optical compressor 120 for compressing the short pulse light. The optical compressor 120 has multi-step configuration of steps polarization beam splitters $121_{1,2}$, optical fibers $122_{1,2}, 123_{1,2}$ for compressing the incident pulse light, polarization rotating element $124_{1,2}$, for rotating the polarization direction of the incident light by 90 degrees to return the light to the optical fibers $123_{1,2}$, polarization maintaining optical fibers $125_{1,2}$ provided to the output side of the polarization beam splitters $121_{1,2}$, and a polarization maintaining optical fiber $125_1$ at the front step is connected to a polarization maintaining optical fiber $125_2$ at the rear step.

15 Claims, 14 Drawing Sheets

OPTICAL COMPRESSOR AND ULTRA-SHORT PULSE LIGHT SOURCE

CROSS-REFERENCE TO RELATED APPLICATIONS

This application is a continuation application of PCT/JP2006/324557, filed Dec. 8, 2006, which claims benefit of and priority to Japanese Patent Application No. 2005-356262, filed Dec. 9, 2005, the entire contents of each of which are incorporated herein by reference.

TECHNICAL FIELD

The present invention relates to an optical compressor and an ultra-short pulse light source used in optical communications, optical metrology, materials processing, physics or the like, and particularly, to an optical compressor and an ultra-short pulse light source for compressing pulse light with use of an optical fiber to generate ultra-short pulse light.

BACKGROUND ART

Recently, ultra-short pulse light having short pulse length, such as subpicosecond pulse length, becomes necessary with increasing demands for high-speed optical communications. Meanwhile, the ultra-short pulse light has become difficult to generate due to limits on the high speed of electric circuitry. In view of this, there is developed an ultra-short pulse light source which utilizes wavelength dispersion and nonlinearity of an optical fiber to generate ultra-short pulse light with use of an optical compressor for compressing pulse length. FIG. 11 conceptually illustrates a structure of the above-mentioned ultra-short pulse light source.

In FIG. 11, an ultra-short pulse light source 1 is structured to have, for example, an optical pulse source 11 for emitting pulse light having several-picosecond pulse length, an optical amplifier 12, such as an EDFA (Er-Doped Fiber Amplifier), for amplifying pulse light emitted from the optical pulse source 11, and a compressor 13, composed of an optical fiber or the like, for compressing the optically-amplified pulse light.

FIG. 12 illustrates an example of an optical fiber used in the compressor 13. The optical fiber which constitutes the compressor 13 includes an adiabatic soliton compressor which utilizes wavelength dispersion and nonlinearity of the optical fiber, such as DDF (Dispersion-Decreasing Fiber, see non-patent document 1, for example) having the wavelength dispersion decreasing in the longitudinal direction of the fiber, SDPF (Step-like Dispersion Profiled Fiber, see non-patent document 2, for example) in which a plurality of optical fibers having different dispersions is used changing the dispersion profile in the longitudinal direction of the fiber, CDPF (Comb-like Dispersion Profiled Fiber, see non-patent document 3, for example) in which two optical fibers having different dispersions are used changing the dispersion profile in the longitudinal direction of the fiber. The adiabatic soliton compression is a method for compressing optical pulses with use of effects of nonlinearity and dispersion, imparting to the basic soliton a gentle perturbation inside the fiber, and is advantageous in that there is so little degradation in time waveforms or spectral profiles. In the DDF method, it is possible to gently decrease the dispersion so that ideal adiabatic soliton compression can be achieved. However, it is difficult to manufacture an optical fiber in which dispersion parameters decrease in an ideal manner along the length of the optical fiber. Accordingly, the SDPF and CDPF methods have been proposed, using a combination of a plurality of optical fibers of different dispersions to decrease an average dispersion along the length of the fiber thereby to achieve a DDF profile by approximation. However, from the standpoint of compression efficiency and ease of manufacture, it is preferable to use CPF (Comb-like Profiled Fiber, see non-patent document 4, for example) which utilizes HNLF as nonlinear medium and dispersion of SMF (Single Mode Fiber) as dispersion medium.

In the above-described ultra-short pulse light source 1, usually, it is difficult to obtain linearly-polarized light outputs because the polarization direction is apt to vary in the optical fiber. Then, in order to maintain the polarization direction, there is disclosed a method of manufacturing a compressor 13 with an optical fiber having a polarization maintaining material (for example, see non-patent document 1). Meanwhile, as shown in FIG. 13, there is disclosed a technique for using a mirror Faraday rotator in a mode locked ultra-short pulse oscillator to compensate variation in the polarization so that one polarization state is maintained during operation (for example, see non-patent document 5).

In FIG. 13, an ultra-short pulse light source 2 has a pumping light source 21, a WDM (Wavelength Divisional Multiplexer) 22, an EDF 30, a polarizer 24, a wavelength plate 25, a mirror Faraday rotator 28 (Faraday rotator with mirror), a focusing lens 27, a Faraday rotator 26 and a mirror 29. The pumping light source 21 pumps the EDF 30 via the WDM 22. The mirror Faraday rotator 28 outputs light having the polarization rotated 90 degrees with respect to that of the incident light. Then, the light travels from the Faraday rotator 26 to the mirror Faraday rotator 28 and vice versa, so that variation in polarization in the non polarization maintaining fiber can be compensated. With this structure, it is possible to obtain light having linear polarization perpendicular to that of the linearly-polarized light input to the mirror Faraday rotator 28.

[Non-Patent Document 1]
K. R. Tamura and M. Nakazawa: "54-fs, 10-GHz soliton generation from a polarization-maintaining dispersion-flattened dispersion-decreasing fiber pulse compressor," Optical Letter, Vol. 26, p. 762, 2001)

[Non-Patent Document 2]
S. V. Chernikov et al.: "Experimental demonstration of step-like dispersion profiling in optical fiber for soliton pulse generation and compression," Electron. Letter, Vol. 30, p. 433, 1994

[Non-Patent Document 3]
S. V. Chernikov et al.: "Comblike dispersion-profiled fiber for soliton pulse train generation", Opt. Lett., Vol. 19, p. 539, 1994

[Non-Patent Document 4]
K. Igarashi et al.: "Ultra-highly pure 160 GHz subpicosecond soliton train generation with average dispersion-managed comb-like dispersion profiled fiber using highly-nonlinear fiber," CLEO2003, CMH 7 page, 2003

[Non-Patent Document 5]
M. E. Fermann et al., "Environmentally Stable Kerr-type mode-lock erbium fiber laser producing 360-fs pulse", Optical Letter, Vol. 19, p. 43, 1994

DISCLOSURE OF INVENTION

Problems to be Solved by the Invention

However, in the ultra-short pulse light source that generates ultra-short pulse light with use of nonlinearity and wavelength dispersion of such a conventional optical fiber, if a pulse compressor is composed of a "special" polarization maintaining optical fiber, there arises a problem that the optical fiber becomes expensive. Here, the special polarization maintaining optical fiber means a polarization maintaining optical fiber (especially) manufactured so as to have wavelength dispersion and nonlinearity suitable for pulse compression, and does not mean a "normal" polarization maintaining fiber (Hereinafter referred to as "PM-SMF") obtained by transforming a normal SMF into a polarization maintaining type. Besides, the structure such as SDPF, CDPF and CPF having multi-step connection of different optical fibers for pulse compression presents problems of troublesome connection of fibers due to different core structures, limits on connecting directions and the like, high cost of the special optical fiber having polarization maintaining material, and the like. Further, increasing difficulty in connection causes problems of degradation of performance, increasing variation in performance, reduction of reliability and the like.

The present invention was carried out to solve such problems, and has an object to provide an optical compressor and an ultra-short pulse light source capable of obtaining linearly-polarized optical pulse outputs without the need to provide special optical fiber having polarization maintaining material and connection therebetween.

Means for Solving the Problem

A first aspect of the present invention is an optical compressor comprising at least one branch each having: an optical device, arranged in an optical path, for receiving pulse light from one direction in the optical path to make the pulse light pass through the optical device into the optical path and for receiving pulse light from an opposite direction in the optical path to output the pulse light into a different optical path; an optical fiber of at least one kind, provided on a side where the pulse light passing through the optical device is received, for compressing the pulse light; and a polarization rotating element, provided on a side where the pulse light passing through the optical device is output from the optical fiber, for rotating by 90 degrees a polarization direction of the pulse light from the optical fiber and returning the pulse light to the optical fiber, wherein, the branches are optically connected in series when said at least one branch comprises two or more branches.

A second aspect of the present invention is characterized in that, in the first aspect, the optical device is a beam splitter or a circulator.

A third aspect of the present invention is characterized by, in the first aspect, further comprising, for each of the at least one branch, a polarization maintaining optical fiber for maintaining the polarization direction of the pulse light, the polarization maintaining optical fiber being connected to an output side of the optical device in the branch so that the branch is optically connected in series to a following branch via the polarization maintaining optical fiber.

A fourth aspect of the present invention is characterized in that, in the third aspect, the polarization maintaining optical fiber is a single mode optical fiber capable of maintaining the polarization direction of the pulse light.

A fifth aspect of the present invention is characterized in that, in the first aspect, the polarization rotating element is a mirror Faraday rotator having a reflecting mirror on a side opposite to a side where the pulse light is input.

A sixth aspect of the present invention is characterized in that, in any one of the first to third aspects, the optical fiber of each of any of the at least one branch comprises a highly nonlinear optical fiber by which a spectrum of the pulse light is widespread with use of nonlinearity of optical characteristics.

A seventh aspect of the present invention is characterized in that, in any one of the first to third aspects, the optical fiber of each of any of the at least one branch comprises a single mode optical fiber and the single mode optical fiber is used to compress the pulse light with use of wavelength dispersion.

An eight aspect of the present invention is characterized in that, in any one of the first to third aspects, the optical fiber of each of any of the at least one branch comprises a highly nonlinear optical fiber and a single mode optical fiber, the highly nonlinear optical fiber utilizes nonlinearity of optical characteristics to spread a spectrum of the pulse light and the single mode optical fiber utilizes wavelength dispersion to compress the pulse light.

A ninth aspect of the present invention is characterized in that, in the sixth or eight aspect, the pulse light propagates in the highly nonlinear optical fiber and the single mode optical fiber or a single mode optical fiber maintaining the polarization direction of the pulse light, alternately.

A tenth aspect of the present invention is characterized in that, in any one of the first to third aspects, the optical fiber of each of any of the at least one branch comprises a single mode optical fiber, the pulse light propagates in the single mode optical fiber or a single mode optical fiber maintaining the polarization direction of the pulse light, alternately, and dispersion of the pulse light decreases in the path by approximation.

An eleventh aspect of the present invention is characterized in that, in any one of the first to third aspects, the optical fiber of each of any of the at least one branch comprises a single mode optical fiber and dispersion of the single mode optical fiber becomes smaller as the branch is closer to an output side.

A twelfth aspect of the present invention is an ultra-short pulse light source comprising: an optical pulse source emitting pulse light; and the optical compressor according to any one of the first to eleventh aspects.

A thirteenth aspect of the present invention is characterized in that, in the twelfth aspect, the optical pulse source has an optical pulse generator for emitting short pulse light and an optical amplifier for amplifying the short pulse light emitted from the optical pulse generator.

A fourteenth aspect of the present invention is characterized in that, in the twelfth or thirteenth aspect, wherein the short pulse light emitted from the optical pulse generator is picosecond pulse light.

Effects of the Invention

As the present invention adopts such a structure that polarization in a non polarization maintaining fiber is compensated by outward and return movements of pulse light in the optical fiber, it is possible to realize an optical compressor and a ultra-short pulse light source that do not need any special polarization maintaining optical fiber for pulse compression.

BRIEF DESCRIPTION OF DRAWINGS

FIG. 7 is a view showing autocorrelation traces of pulse light output from the optical compressor structured as shown in FIG. 5 and the like;

BRIEF DESCRIPTION OF REFERENCES

Figure 1:
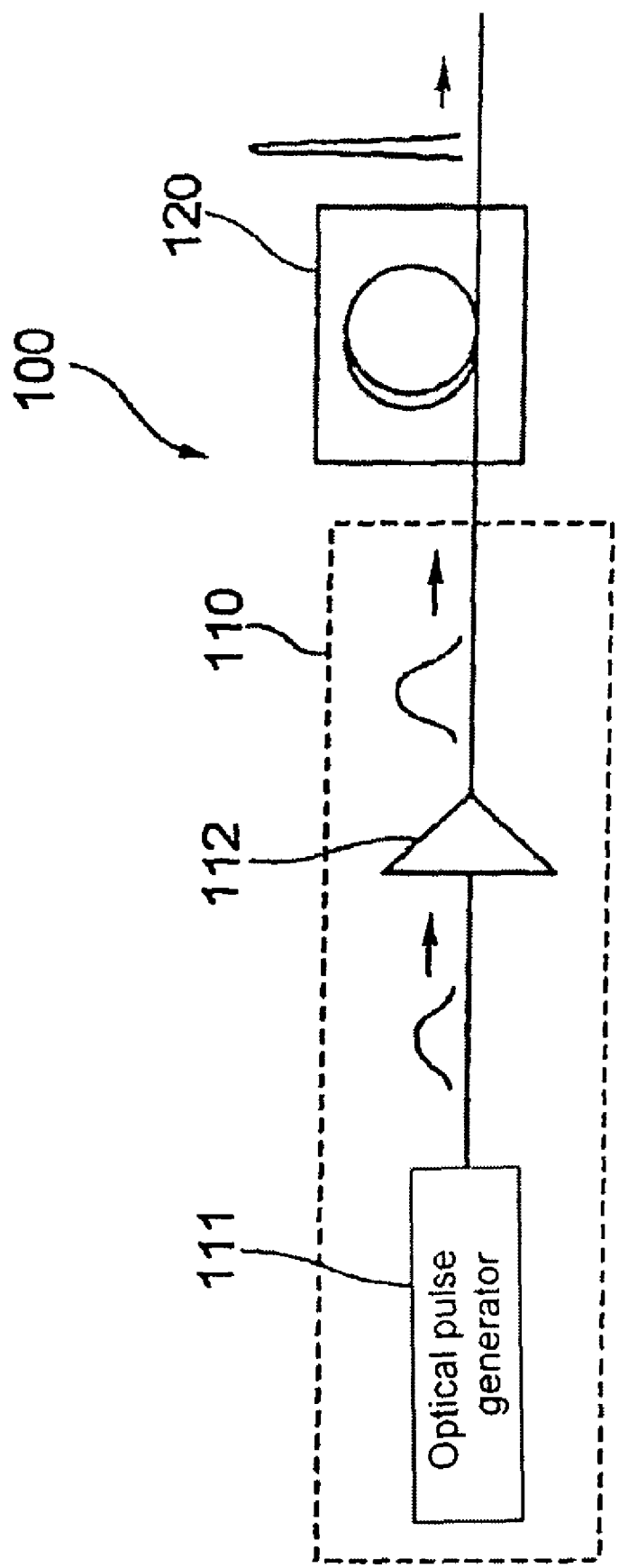
FIG. 1 is a block diagram of an ultra-short pulse light source according to a first embodiment of the present invention.

1 . . . ultra-short pulse light source
2 . . . mode locked ultra-short pulse generator
11 . . . optical pulse source
12 . . . optical amplifier
13 . . . compressor
21 . . . pumping light source
22 . . . WDM
23 . . . EDF
24 . . . beam splitter
25 . . . wavelength plate
26 . . . Faraday rotator
27 . . . focusing lens
28 . . . mirror Faraday rotator (which is a Faraday rotator with mirror)
29 . . . mirror
100 . . . ultra-short pulse light source
110 . . . optical pulse source
111, 210 . . . optical pulse generator
112 . . . optical amplifier
113 . . . chirp compensator
114 . . . seed pulse generator
115 . . . band pass filter
120, 220, 320, 420 . . . optical compressor
$121_1, 121_2, 221_{1\ to\ 4}, 321_{1\ to\ 4}, 421_{1\ to\ 4}$ . . . polarization beam splitter
$122_1, 122_2, 222_{1\ to\ 4}, 322_{1\ to\ 4}, 422_{1\ to\ 4}$ . . . HNLF
$123_1, 123_2, 323_1, 323_2, 423_3, 423_4$ . . . SMF
$124_1, 124_2, 224_{1\ to\ 4}, 324_{1\ to\ 4}, 424_{1\ to\ 4}$ . . . mirror Faraday rotator
$125_1, 125_2, 225_{1\ to\ 4}, 325_{1\ to\ 4}, 425_{1\ to\ 4}$ . . . PM-SMF

BEST MODES FOR CARRYING OUT THE INVENTION

With reference to the drawings, embodiments of the present invention will now be described below.

FIG. 1 is a block diagram illustrating an ultra-short pulse light source according to a first embodiment of the present invention. In FIG. 1, the ultra-short pulse light source 100 includes an optical pulse source 110 for emitting short pulse light having pulse length of several picoseconds by amplifying the light; and an optical compressor 120 compressing the pulse light emitted from the optical pulse source 110. Here, the optical pulse source 110 has an optical pulse generator 111 for emitting short pulse light having a pulse length of several picosecond, and an optical amplifier 112 such as an EDFA (Er-Doped Fiber Amplifier) for amplifying the short pulse light emitted from the optical pulse generator 111.

Figure 2:
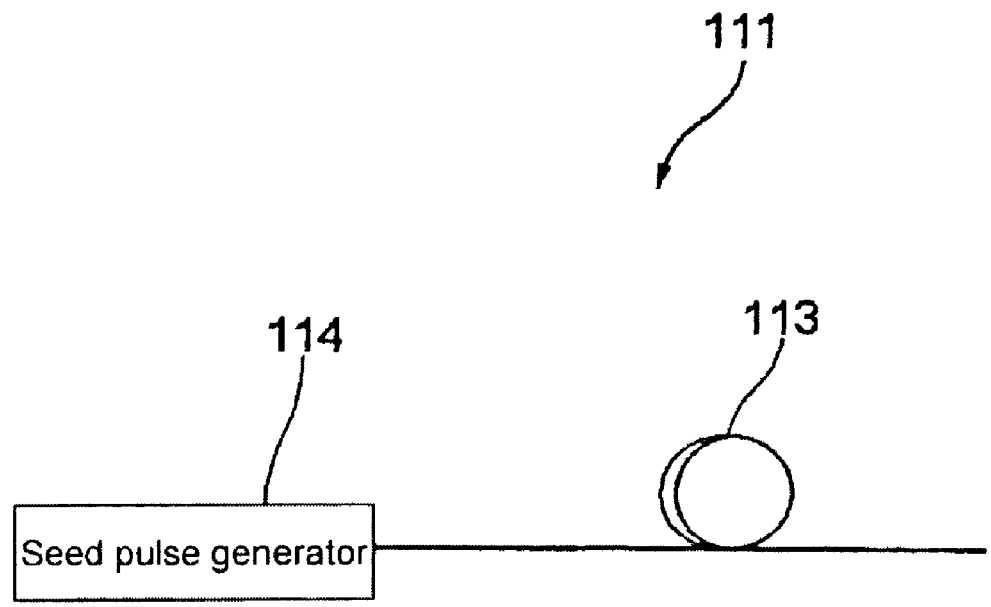
FIG. 2 is a view illustrating another structure example of an optical pulse generator.

FIG. 2 is a view showing a structure example of the optical pulse generator 111 shown in FIG. 1. The optical pulse generator of FIG. 2 includes a seed pulse generator 114 and a chirp compensator 113 for compensating chirp of the seed pulse generator 114. The seed pulse generator 114 is structured to generate seed pulses by switching gains of direct modulation type DFB-LD (Distributed Feedback Laser Diode) with electric pulses of 100 to 300 ps. Optical pulses generated by gain switching sometimes have chirps. Then, the chirp compensator 113, which adjusts time waveforms of optical pulses by generating a given time delay in light of wavelength components of the optical pulses, is used to compensate chirps to make the optical pulses transform-limited pulses. Specifically, chirp is better compensated by a dispersion compensating optical fiber. Hereinafter, this function of the dispersion compensating optical fiber is called dispersion compensation.

In addition, the optical pulse generator 111 may have a TLS (Tunable Light Source) for emitting CW light, an LN modulator and a modulation signal source and be structured to make the LN modulator modulate the CW light emitted from the TLS in accordance with a signal from the modulation signal source to emit short pulse light having a predetermined pulse length. Here, the pulse length of optical pulses emitted from the optical pulse generator 111 is about several picoseconds, however, the length may be any other length according to need. As the structure of the optical pulse generator 111 is well known, further explanation thereof is omitted here.

The optical amplifier 112 is for amplifying light over wavelengths of pulse light output from the optical pulse generator 111 to optimal pulse energy, and can be used according to need. Used as this optical amplifier 112 is, for example, a fiber amplifier such as EDFA, a semiconductor optical amplifier (SOA) or the like.

Figure 3:
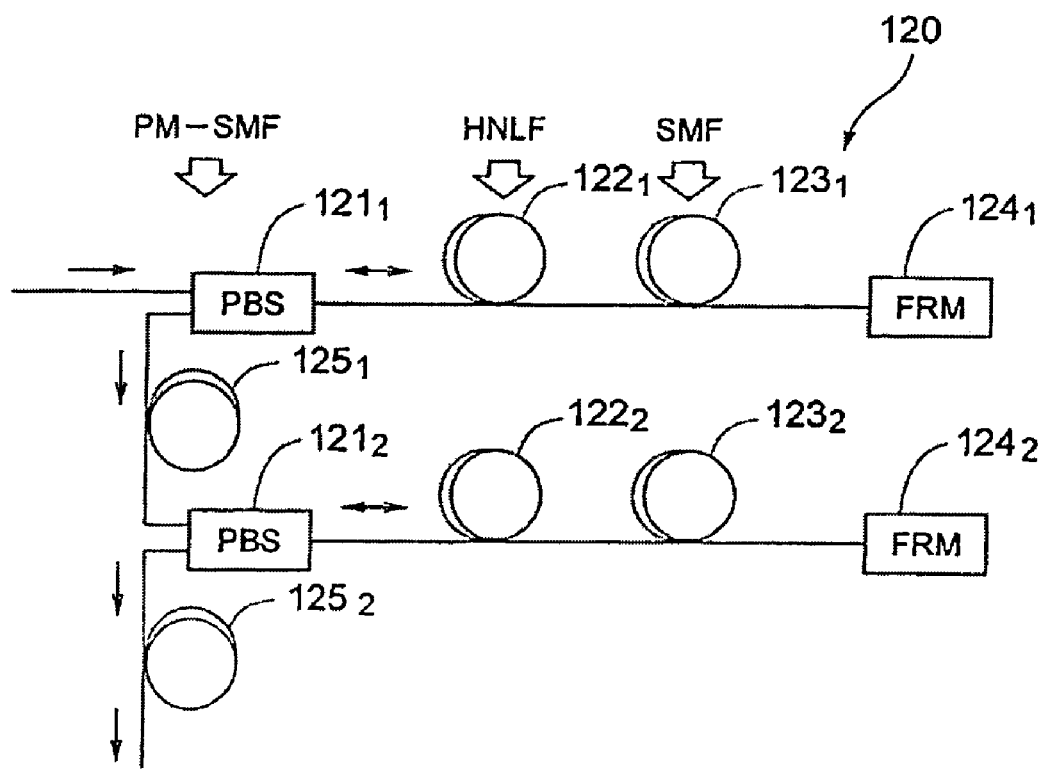
FIG. 3 is a block diagram of an optical compressor according to the first embodiment of the present invention.

FIG. 3 is a block diagram of an optical compressor according to the first embodiment of the present invention. In FIG. 3, the optical compressor 120 has PBMs (Polarization Beam Splitters) $121_i$ (i=1 to n), HNLFs (Highly Non-Linear Fibers) $122_i$ (i=1 to n) having strong nonlinearity per unit length, SMFs (Single Mode Fibers) $123_i$ (i=1 to n), mirror Faraday rotators $124_i$ (i=1 to n) (here, the mirror Faraday rotator means a Faraday rotator with mirror), and polarization maintaining (PM) optical fibers $125_i$ (i=1 to n) maintaining polarization direction of incident light. Here, n is a natural number.

Here, a part composed of each PBS $121_i$ (i=1 to n), a corresponding HNLF $122_i$ (i=1 to n) having strong nonlinearity per unit length, a corresponding SMF $123_i$ (i=1 to n), and a corresponding mirror Faraday rotator $124_i$ (i=1 to n) is called ith branch (i=1 to n). In addition, a part composed of each ith branch (i=1 to n) and a corresponding PM optical fiber $125_i$ (i=1 to n) is called ith step (i=1 to n).

Each PBS $121_i$ is structured to split a light beam into light beams with polarization direction perpendicular to each other. In this invention, the ith branch is configured to make the polarization direction of pulse light returned from the ith branch form an angle of 90 degrees relative to the polarization direction of the incident light. Then, each PBS $121_i$ is structured to make the incident pulse light pass therethrough to enter the ith branch and also to reflect the pulse light returned from the ith branch to output to the PM optical fiber $125_i$.

Each HNLF $122_i$ used here has a nonlinear constant of about 20/W/km and a wavelength dispersion of about −0.2 ps/nm/km. The HNLF $122_i$ may have a uniform nonlinear constant along the light traveling direction in the fiber and does not need to have special distribution of nonlinear constants. In each HNLF $122_i$, pulse light is subjected to continuous production of new frequency components due to self-phase modulation modulation that is a nonlinear phenomenon. In other words, the spectrum of output pulse light is widespread as compared with the pulse light input to each HNLF $122_i$. In addition, the pulse light comes to have a chirp due to self-phase modulation.

When passing through each HNLF $122_i$, an optical pulse has chirp due to self-phase modulation. Specifically, the frequency at the pulse rise time is lower than the carrier frequency and the frequency at the pulse fall time is higher than the carrier frequency. Pulse of which the spectrum is widespread by each HNLF $122_i$ is subjected to chirp compensation by an anomalous dispersion fiber so that the pulse light can be compressed. Each SMF $123_i$ is a normal single mode fiber having anomalous dispersion of about 16 ps/nm/km and serves as to compensate chirp due to self-phase modulation occurring on the outward path of each HNLF $122_i$.

Each mirror Faraday rotator $124_i$ is structured such that in the outward path, for example, the polarization direction is rotated about the incident direction by Faraday rotational angle θ, the phase is inverted by reflection, resulting in rotation of polarization direction totally by θ+180 degrees, and then, in the return path, the polarization direction is rotated about the outgoing direction by −θ degrees, or about the incident direction by θ degrees, resulting in rotation of polarization direction totally by 2θ+180 degrees. Hereinafter, the Faraday rotational angle θ is set to 45 degrees and each mirror Faraday rotator $124_i$ is structured to form an angle of 90 degrees of the polarization direction of pulse light input to the mirror Faraday rotator $124_i$ with respect to that of the pulse light output therefrom.

Each polarization maintaining (PM) optical fiber $125_i$ is an optical fiber structured to maintain the polarization direction of incident pulse light. In other words, each PM optical fiber $125_i$ only has to be an optical fiber having birefringence due to optical anisotropy, for example, and capable of maintaining the polarization direction at an axis perpendicular to the light traveling direction (hereinafter referred to as "polarization maintaining axis").

Each PM optical fiber $125_i$ is a fiber having anomalous dispersion of about 16 ps/nm/km and serves to compensate chirp due to self-phase modulation occurring in the return path in each HNLF $122_i$. Each PM optical fiber $125_i$ is a polarization maintaining type SMF that is a relatively inexpensive and easily-available optical fiber.

Figure 4:
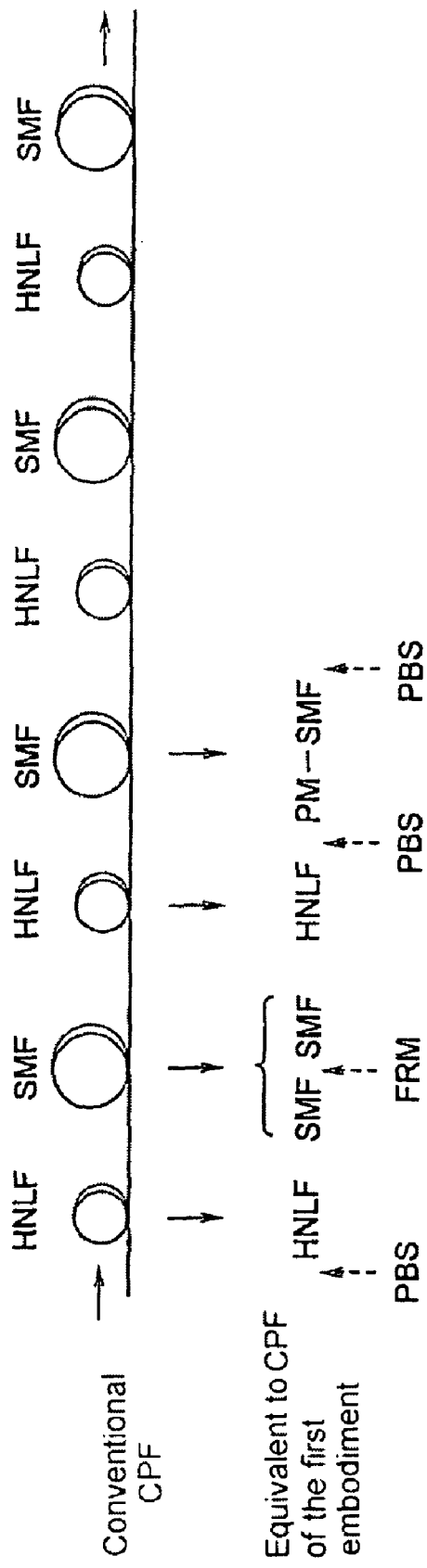
FIG. 4 is a view for explaining each step of the optical compressor of the first embodiment of the present invention in view of compression of pulse light.

FIG. 4 is a view for explaining each step of the optical compressor according to the first embodiment of the present invention from the standpoint of compression of pulse light. The upper view of FIG. 4 conceptually illustrates a conventional CPF (Comb-like Profiled Fiber) composed of HNLF and SMF, and the lower view of FIG. 4 conceptually illustrates arrangement of optical fibers equivalent to fibers of each step of the optical compressor 120 of FIG. 3 seen in the traveling direction of pulse light.

As the optical compressor 120 is structured as above, optical fibers of each step becomes equivalent to the fibers arranged as shown in the lower view of FIG. 4 from the standpoint of pulse light compression. In other words, in FIG. 4, optical fibers of each step are equivalent to a CPF having a HNLF $122_i$, a SMF $123_i$, a SMF $123_i$, a HNLF $122_i$, and a PM-SMF $125_i$ arranged in this order from the input side. Here, in the SMF $123_i$, the single mode optical fiber may be replaced with a polarization maintaining single mode optical fiber. From the standpoint of pulse light compression, the HNLF $122_i$, the SMF $123_i$, and the PM-SMF $125_i$ are used to constitute two pairs of HNLF and SMF used in the CPF. In the structure shown in FIG. 3, the optical compressor 120 is composed of first and second steps, it is equivalent to an optical compressor structured with four pairs of HNLF and SMF used in the CPF.

Next description is made about the operation of the optical compressor and the ultra-short pulse light source according to the first embodiment of the present invention. First, pulse light output from the optical pulse generator 111 is amplified by the optical amplifier 112 and then input to the optical compressor 120. The pulse light received by the optical compressor 120 is, at the first step, made to pass through the PBS $121_1$ and enter the first branch, passing through the HNLF $122_1$ and the SMF $123_1$, and finally entering the mirror Faraday rotator $124_1$. Here, as the HNLF $122_1$ and the SMF $123_1$ do not maintain polarization, the light input to the mirror Faraday rotator $124_1$ generally has polarization direction changed due to optical characteristics of the HNLF $122_1$ and the SMF $123_1$. The pulse light input to the mirror Faraday rotator $124_1$ is reflected with the polarization direction rotated 90 degrees. The pulse light output from the mirror Faraday rotator $124_1$ is then made to pass through the SMF $123_1$, the HNLF $122_1$ of the first branch in this order so as to compensate polarization change that has occurred in the outward path and is returned toward the PBS $121_1$. Consequently, the pulse light returned to PBS $121_1$ has polarization direction 90-degree changed from that of the incident pulse light, and therefore, the light is taken out by an output port of the PBS $121_1$ to be input to the PM-SMF $125_1$. The pulse light input to the PM-SMF $125_1$ propagates there with polarization direction maintained, and to sum up, the pulse light is compressed at the first step totally by two pairs of HNLF and SMF used in the CPF.

Likewise, at the second step, the pulse light is made to pass through the PBS $121_2$ and enter the first branch, passing through the HNLF $122_2$ and the SMF $123_2$, and finally entering the mirror Faraday rotator $124_2$. Here, for the same reason as that of the first step, the light input to the mirror Faraday rotator $124_2$ generally has polarization direction changed due to optical characteristics of the HNLF $122_2$ and the SMF $123_2$. The pulse light input to the mirror Faraday rotator $124_2$ is reflected with the polarization direction rotated 90 degrees like in the first step. The pulse light output from the Faraday rotator $124_1$ is then made to pass through the SMF $123_2$, the HNLF $122_2$ of the second branch in this order so as to compensate polarization change that has occurred in the outward path and is returned toward the PBS $121_2$. Consequently, the pulse light returned to PBS $121_2$ has polarization direction 90-degree changed from that of the incident pulse light, and therefore, the light is taken out by an output port of the PBS $121_2$ to be input to the PM-SMF $125_2$. The pulse light input to the PM-SMF $125_2$ propagates there with polarization direction maintained. Finally, the pulse light is compressed at the first and second steps, totally by four pairs of HNLF and SMF used in the CPF, and output from the optical compressor 120 with the same polarization direction as that of the incident light maintained.

Figure 5:
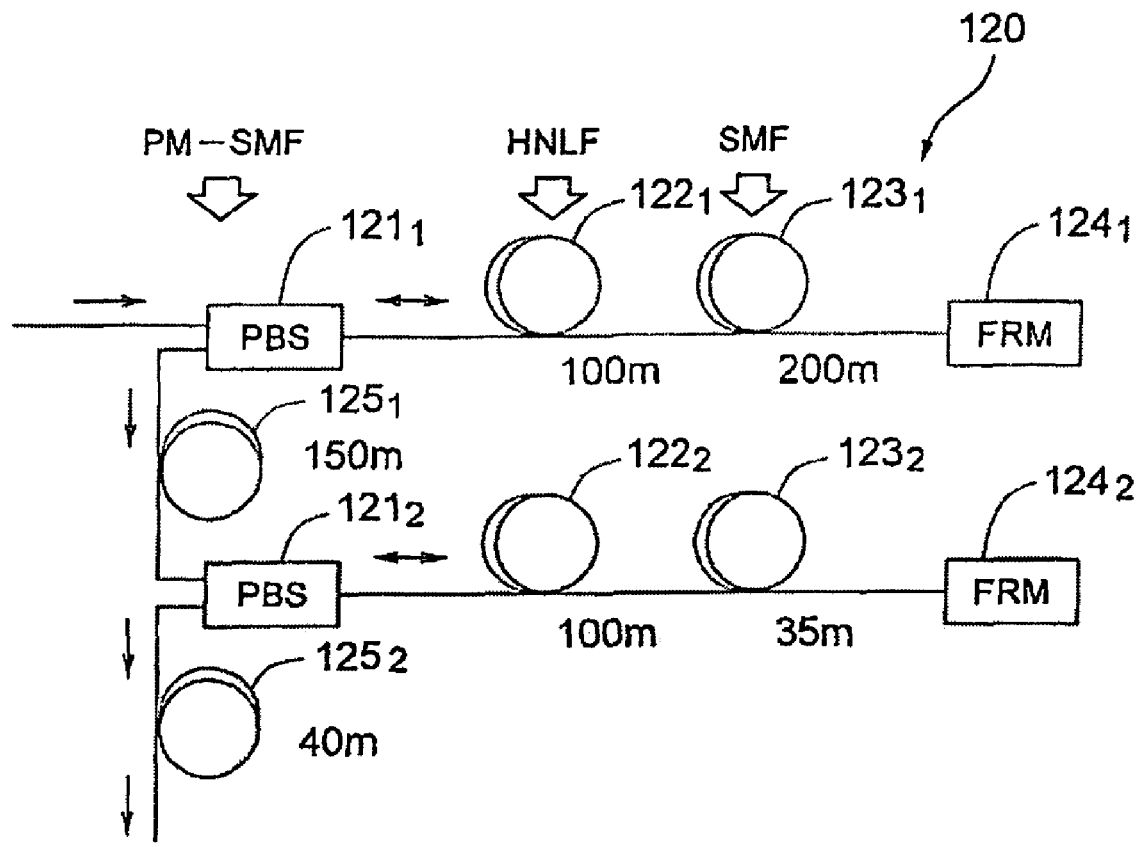
FIG. 5 is a view illustrating a structure of an optical compressor 120 used in evaluation of compression of pulse light.

FIG. 5 is a view illustrating a structure of the optical compressor 120 used in evaluation of compression of pulse light. In FIG. 5, the HNLF $122_1$, the SMF $123_1$ and the PM-SMF $125_1$ at the first step have lengths of 100 m, 200 m, and 150 m, respectively, and the HNLF $122_2$, the SMF $123_2$ and the PM-SMF $125_2$ at the second step have lengths of 100 m, 35 m, and 40 m, respectively. Here, the optical pulse generator 110 structured as shown in FIG. 2 is used in evaluation of compression of pulse light. The optical pulses are generated by gain switching a direct modulation type DFB-LD (Distributed Feedback-Laser Diode) used as the optical pulse source 111 and dispersion-compensated by a dispersion compensation optical fiber.

Figure 6:
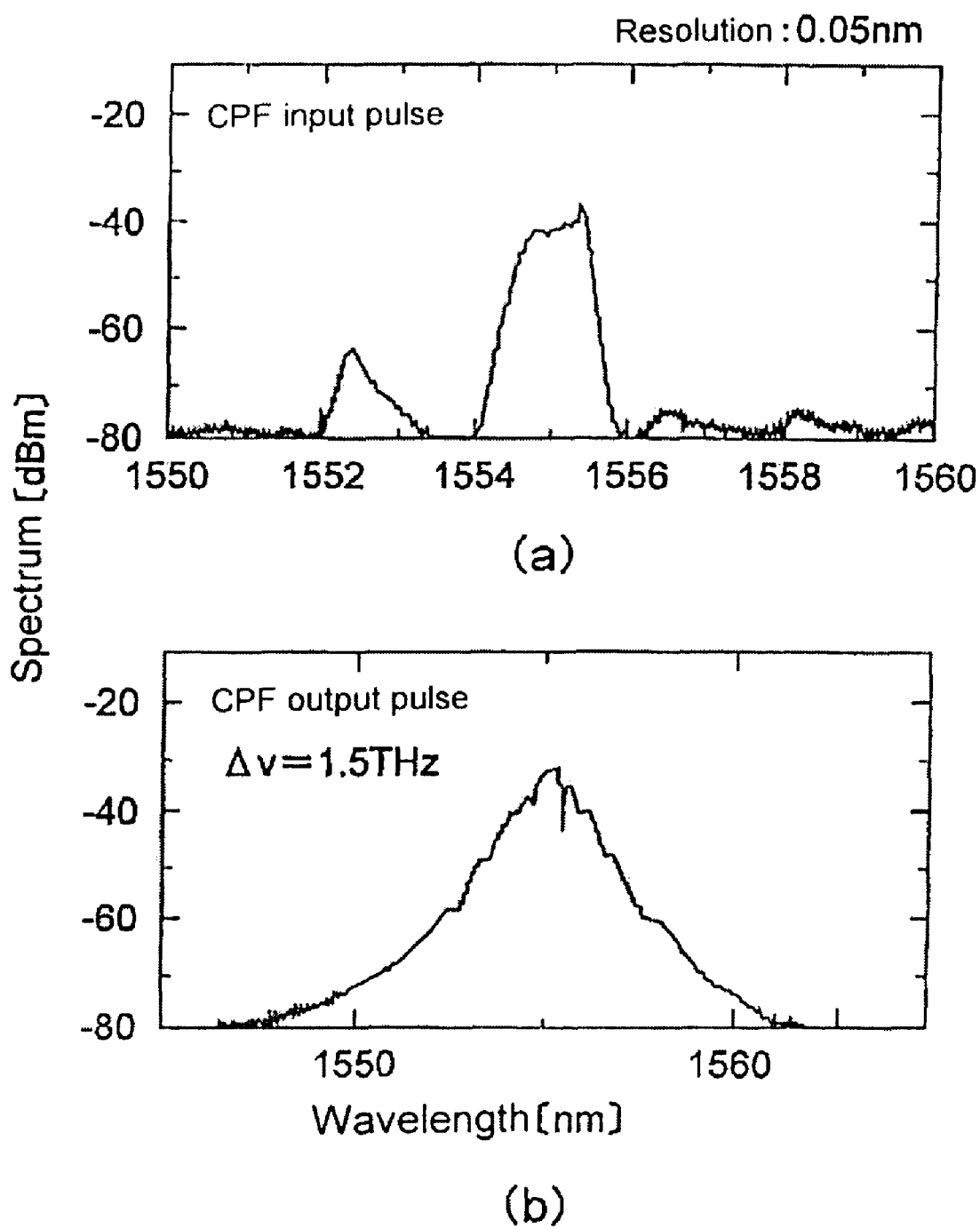
FIG. 6 is a view for explaining an example of spectra of the optical compressor 120 structured as shown in FIG. 5.

FIG. 6 is a view for explaining an example of spectra of the optical compressor structured as shown in FIG. 5. Here, FIG. 6(a) is a view showing a wavelength spectrum of pulse light input to the optical compressor 120 and FIG. 6(b) is a view showing a wavelength spectrum of pulse light output from the optical compressor 120. As seen from FIG. 6, the pulse light outputted from the optical compressor 120 has a broader spectrum profile as compared with the pulse light input to the optical compressor 120.

Figure 7:
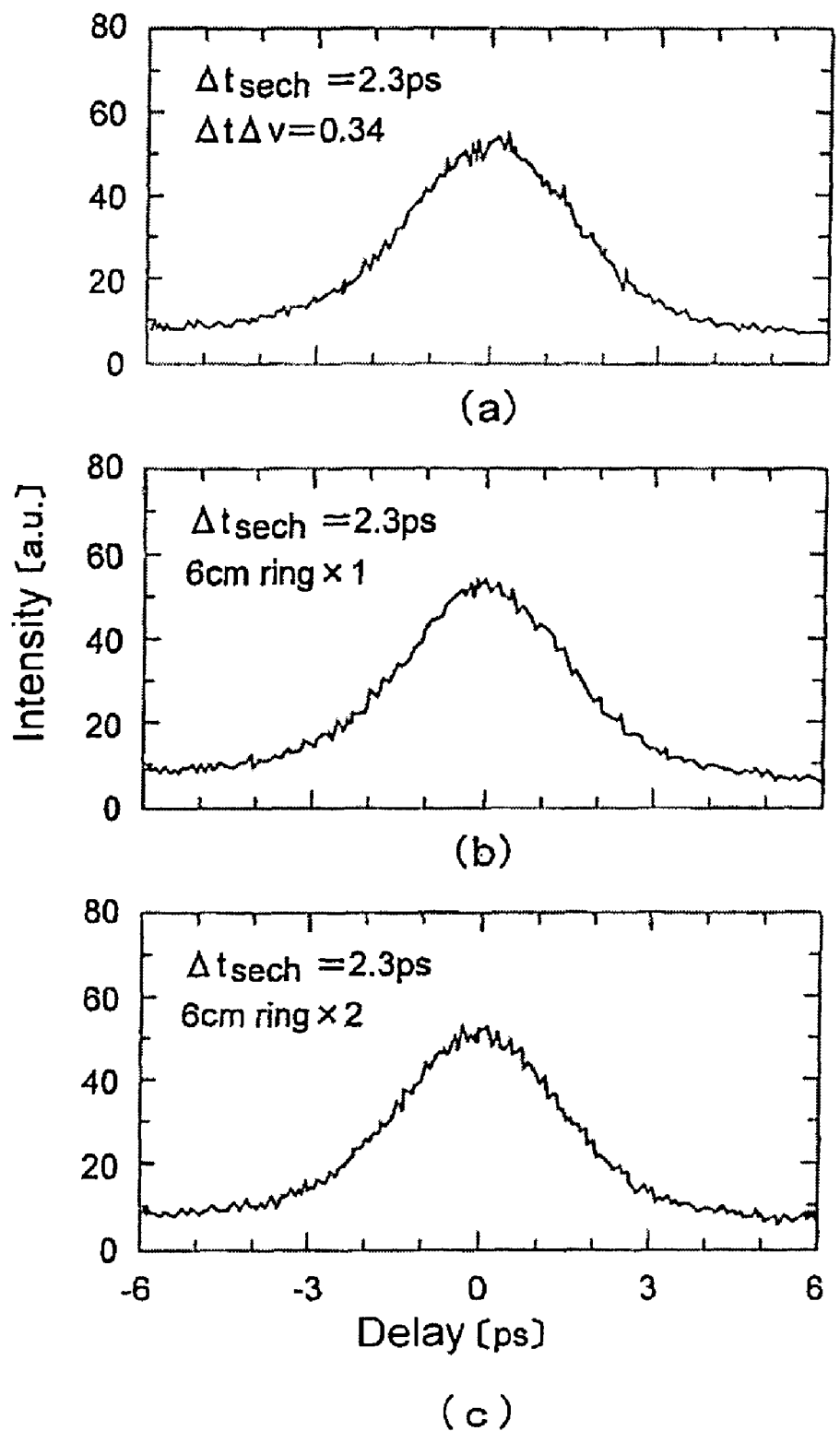

FIG. 7 is a view showing autocorrelation traces of pulse light output from the optical compressor 120 structured as shown in FIG. 5. FIG. 7(a) is a view showing an autocorrelation trace of the pulse light output from the optical compressor 120 structured as shown in FIG. 5. Here, the pulse light input to the optical compressor 120 has a wavelength spectrum profile as shown in FIG. 6(a) and a FWHM (Full Width Half Maximum) of 7.2 ps. The pulse light output from the optical compressor 120 structured as shown in FIG. 5 is light which is compressed to $sech^2$ pulses and has a FWHM of 2.3 ps.

FIG. 7(b) shows an autocorrelation trace of output pulse light obtained when the SMF $123_2$ having a length of 35 m shown in FIG. 5 is used to make a ring having a diameter of 6 cm. In this way, even if the polarization state in the SMF $123_2$ is changed, the polarization is compensated in the outward path of the mirror Faraday rotator $124_2$ and the PBS $121_2$ and the fixed autocorrelation trace can be obtained. Likewise, FIG. 7(c) shows an autocorrelation trace of output pulse light obtained by adding two SMF rings each having a diameter of 6 cm. As seen from FIG. 7(b) and FIG. 7(c), even if polarization of light in a non polarization maintaining optical fiber is changed, the autocorrelation trace of pulse light is not changed. The PBS $121_2$ in the optical compressor 120 serves to make only a component along the polarization direction pass therethrough. If the polarization direction is not compensated during outward and return movements in the non polarization maintaining optical fiber, the intensity and pulse width of the optical pulses output from the PBS $121_2$ must be changed. As the autocorrelation trace of pulse light is not changed even when the polarization of the light in the non polarization maintaining optical fiber is changed, the pulse light input to the optical compressor 120 is subjected to compensation of polarization variation by propagating from the HNLF $122_i$ to the SMF $123_i$, and vice versa and is output with its linear polarization maintained.

The optical compressor and ultra-short pulse light source according to the first embodiment of the present invention are structured, as described above, with no special optical fiber having polarization maintaining material. With this structure, fiber connection is facilitated and it is possible to suppress degradation of performance, increase of performance variation, reduction of reliability and the like due to the connection difficulty. Further, as the optical compressor and ultra-short pulse light source according to the first embodiment of the present invention can adopt commonly-used SMF, HNLF and PM-SMF, they can be realized with a simple structure.

In addition, the pulse light is subjected to outward and return movements in the SMF and HNLF, and therefore, as compared with conventional optical compressor and ultra-short pulse light source, the optical compressor and ultra-short pulse light source according to this embodiment are allowed to reduce lengths of the SMF and HNLF and the number of connections between these fibers, bringing extremely profound effects of performance improvement, compactness, easy manufacture, cost reduction and the like.

Here, in the above description, the light is reflected by the mirror Faraday rotator $124_1$ and returns to be taken out by PBS $121_1$. However, a polarization maintaining circulator may be used instead of the PBS $121_1$. The circulator is an optical device having functions of making incident light in one direction pass therethrough and outputting returned light via another port. However, as the light having polarization rotated 90 degrees is output, a PM-SMF of the output port of the polarization maintaining circulator and the PM-SMF $125_1$ may be fusion-bonded with their axes rotated 90 degrees relative to each other.

Figure 8:
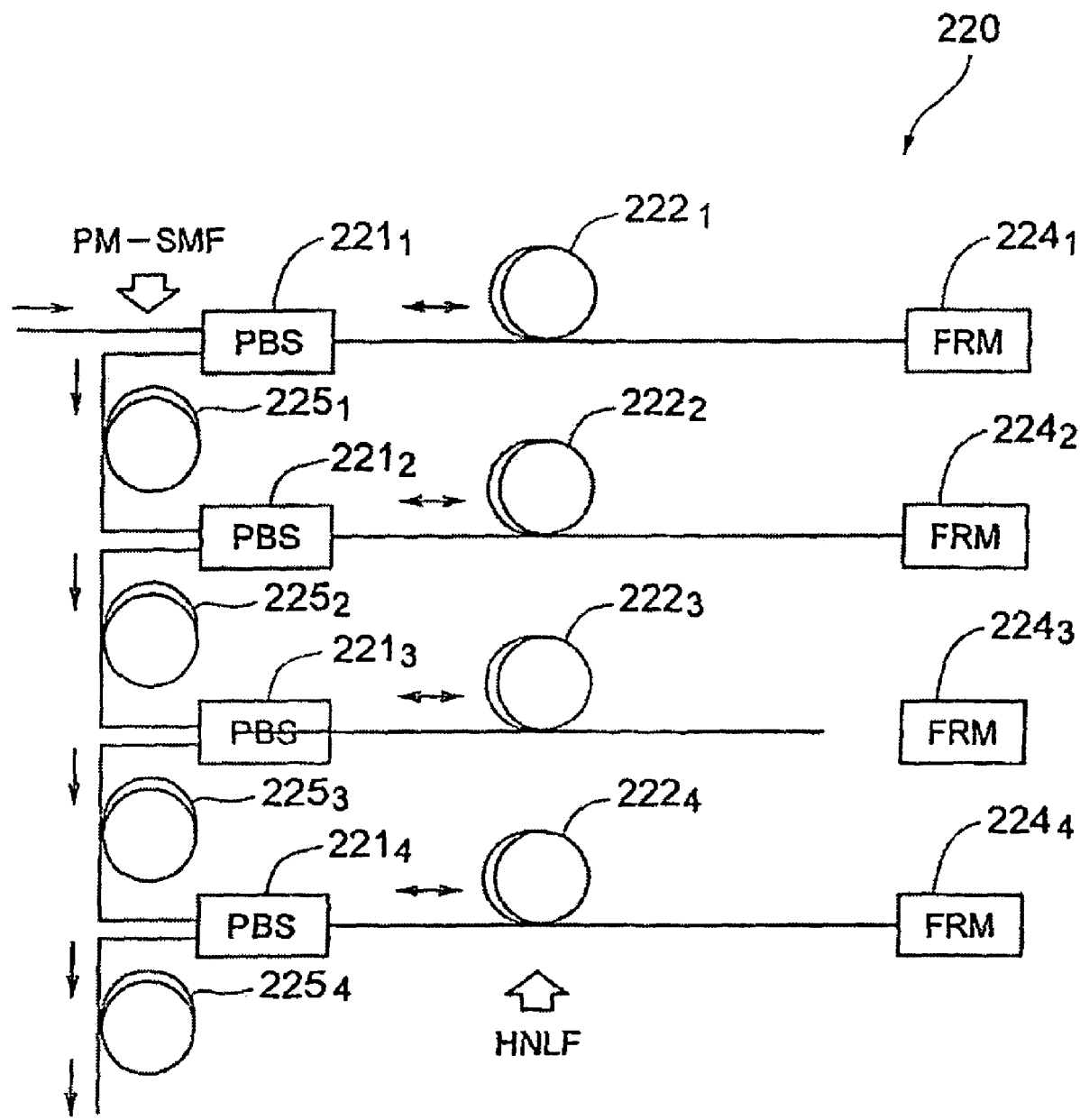
FIG. 8 is a block diagram of an optical compressor according to a second embodiment of the present invention.

FIG. 8 is a block diagram of an optical compressor according to a second embodiment of the present invention. In FIG. 8, the optical compressor 220 has PBSs $221_i$ (i=1 to n), HNLFs $222_i$ (i=1 to n), mirror Faraday rotators $224_i$ (i=1 to n) and PM (polarization maintaining) optical fibers $225_i$ (i=1 to n) for maintaining polarization direction of incident light.

Each PBS $221_i$, each HNLF $222_i$, each mirror Faraday rotator $224_i$, and each PM optical fiber $225_i$ have identical structures of each PBS $121_i$, each HNLF $122_i$, each mirror Faraday rotator $124_i$, and each PM optical fiber $125_i$, respectively, of the first embodiment. Therefore, more detailed explanation thereof is omitted here.

Here, a HNLF $222_i$ and a PM optical fiber $225_i$ of each step constitute a pair of HNLF and SMF used in a CPF. With this structure, the numbers of HNLF and SMF are increased or decreased in pairs and designing of CPF is facilitated. Besides, the same effects as those of the optical compressor according to the first embodiment of the present invention can be obtained, that is, connection between special fibers having polarization maintaining material becomes unnecessary, the fiber length can be shorter than that of the conventional optical compressor, and the like.

Here, the above description treats the example in which the optical compressor constitutes a CPF. Here, in the optical compressor of the second embodiment of the present invention, the HNLF $222_i$ is replaced with a dispersion shifted fiber (DSF) and wavelength dispersion is approximately decreased in a path of optical pulses so that a CDPF (Comb-like Dispersion Profiled Fiber) can be realized. In addition, the HNLFs $222_i$ are replaced with most suitable fibers for SDPF (Step-like Dispersion Profiled Fiber) and are structured so that the wavelength dispersion is smaller as the branch is closer to the output side, and thereby the SDPF can be realized. However, in the case of SDPF, the PM optical fiber $225_i$ serves to connect each PBS $221_i$ and not to contribute to pulse compression. Unlike the CDPF, SDPF and CPF, the DDF (Dispersion Decreasing Fiber) needs fibers having continuously decreasing wavelength dispersion, and therefore, is not suitable for polarization maintaining technology using a mirror Faraday rotator. In other words, as the CDPF, SDPF and CPF are configured with multistep connection of different fibers, they are suitable for the polarization maintaining technology using a mirror Faraday rotator. Besides, as the CDPF and CPF use SMFs as dispersion medium, standard PM-SMFs can be used in a part of the dispersion medium. Hence, they are especially advantageous in that they are configured with a less number of steps. Further, in the case of CPF, the HNLF is used as a nonlinear medium, which makes it possible to make the fiber length of the nonlinear medium shorter and to compensate more rapid change in polarization in the non PM optical fiber.

Figure 9:
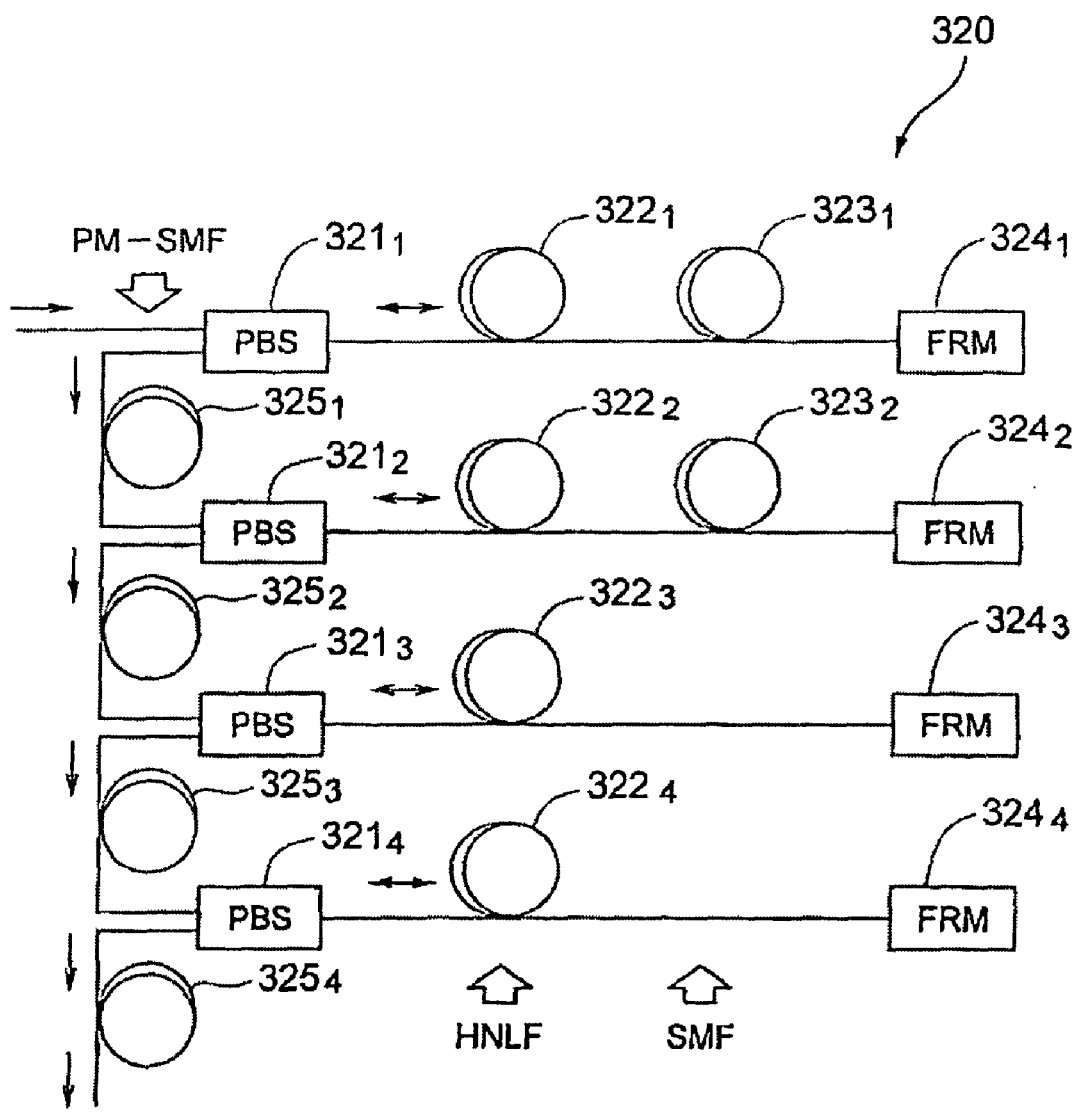
FIG. 9 is a block diagram of an optical compressor according to a third embodiment of the present invention.

FIG. 9 is a view illustrating a block diagram of an optical compressor according to a third embodiment of the present invention. In FIG. 9, the optical compressor 320 has first type steps of PBS $321_i$ (i=1 to k), HNLF $322_i$ (i=1 to k), SMF $323_i$ (i=1 to k), mirror Faraday rotator $324_i$ (i=1 to k) and PM (polarization maintaining) optical fiber $325_i$ (i=1 to k) for maintaining polarization direction of incident light, and second type steps of PBS $321_j$ (j=k+1 to n), HNLF $322_j$ (j=k+1 to n), mirror Faraday rotator $324_j$ (j=k+1 to n) and PM (polarization maintaining) optical fiber $325_j$ (j=k+1 to n) for maintaining polarization direction of incident light. Here, k is a natural number ranging from 1 to (n−1).

Each PBS $321_i$, $321_j$, each HNLF $322_i$, $322_j$, each SMF $323_i$, each mirror Faraday rotator $324_i$, $324_j$, and each PM optical fiber $325_i$, $325_j$, have identical structures of each PBS $121_i$, each HNLF $122_i$, each SMF $123_i$, each mirror Faraday rotator $124_i$, and each PM optical fiber $125_i$, respectively, of the first embodiment. Therefore, more detailed explanation thereof is omitted here.

Here, a HNLF $322_i$, a SMF $323_i$, and a PM optical fiber $325_i$ of each first type step constitute two pairs of HNLF and SMF used in CPF. Besides, a HNLF $322_j$, and PM optical fiber $325_j$ of each second type step constitute a pair of HNLF and SMF used in CPF. With this structure, the compression rate of pulse light is enhanced at each first type step and the numbers of HNLF and SMF can be increased or decreased in pairs at each second type step. Further, the same effects as those of the optical compressor according to the first embodiment of the present invention can be obtained, that is, connection between special fibers having polarization maintaining material becomes unnecessary, the fiber length can be shorter than that of the conventional optical compressor, and the like.

Figure 10:
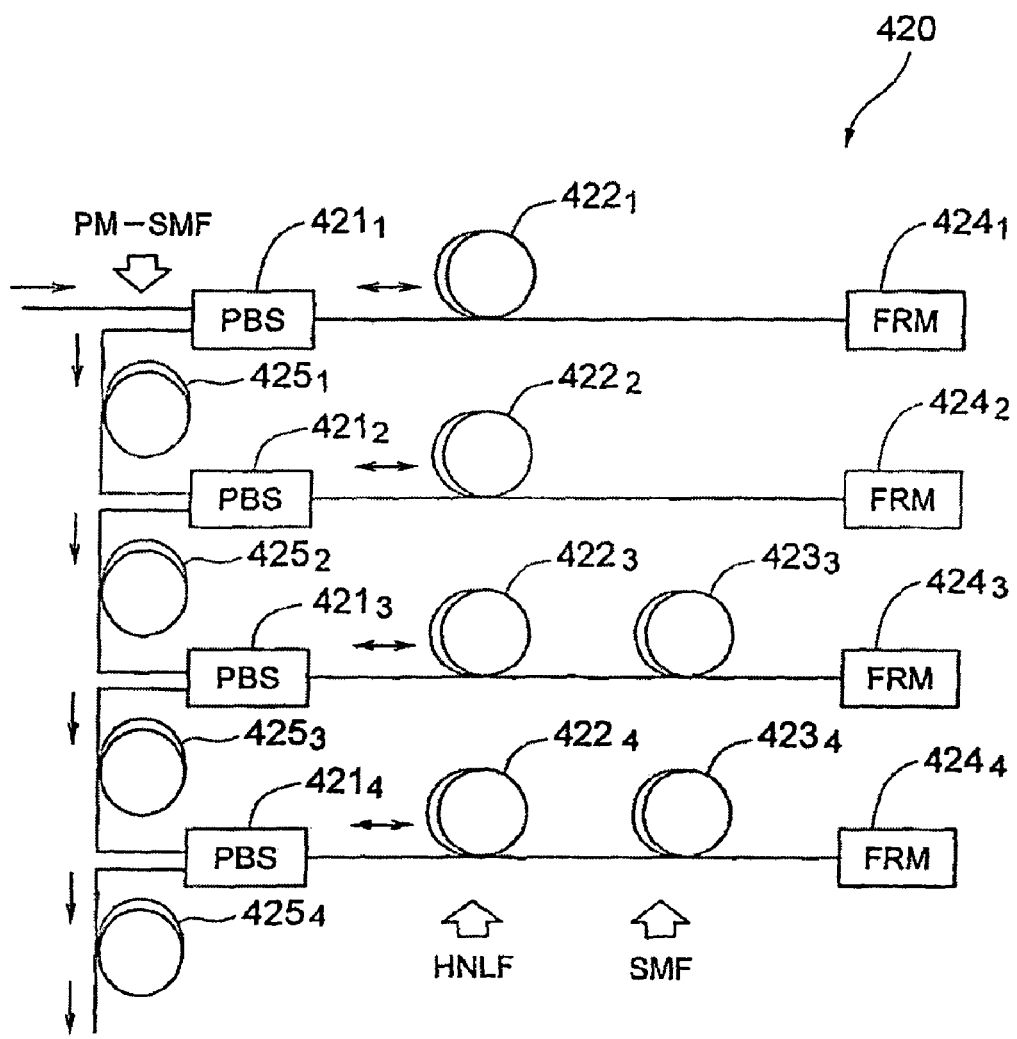
FIG. 10 is a block diagram of another structure of the optical compressor according to the third embodiment of the present invention.
Figure 11:
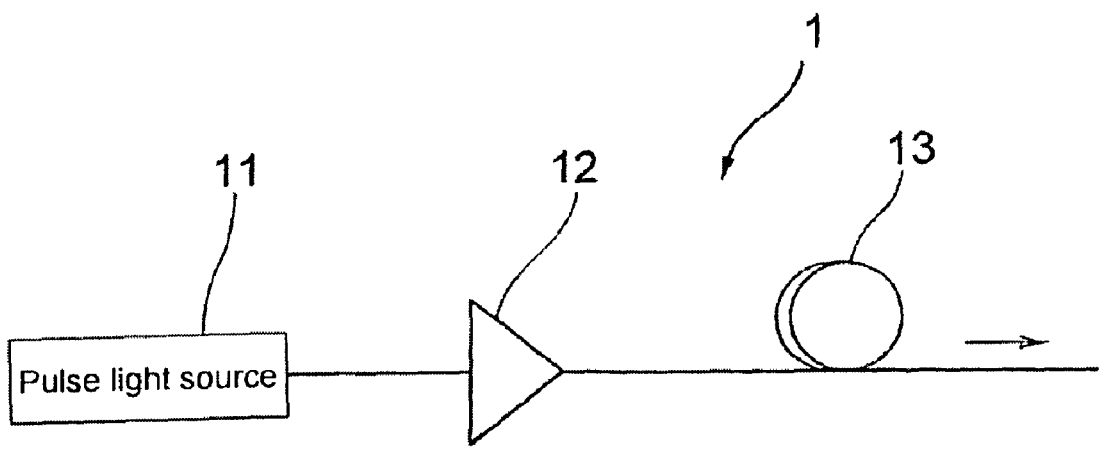
FIG. 11 is a view conceptually illustrating a structure of a conventional ultra-short pulse light source.
Figure 12:
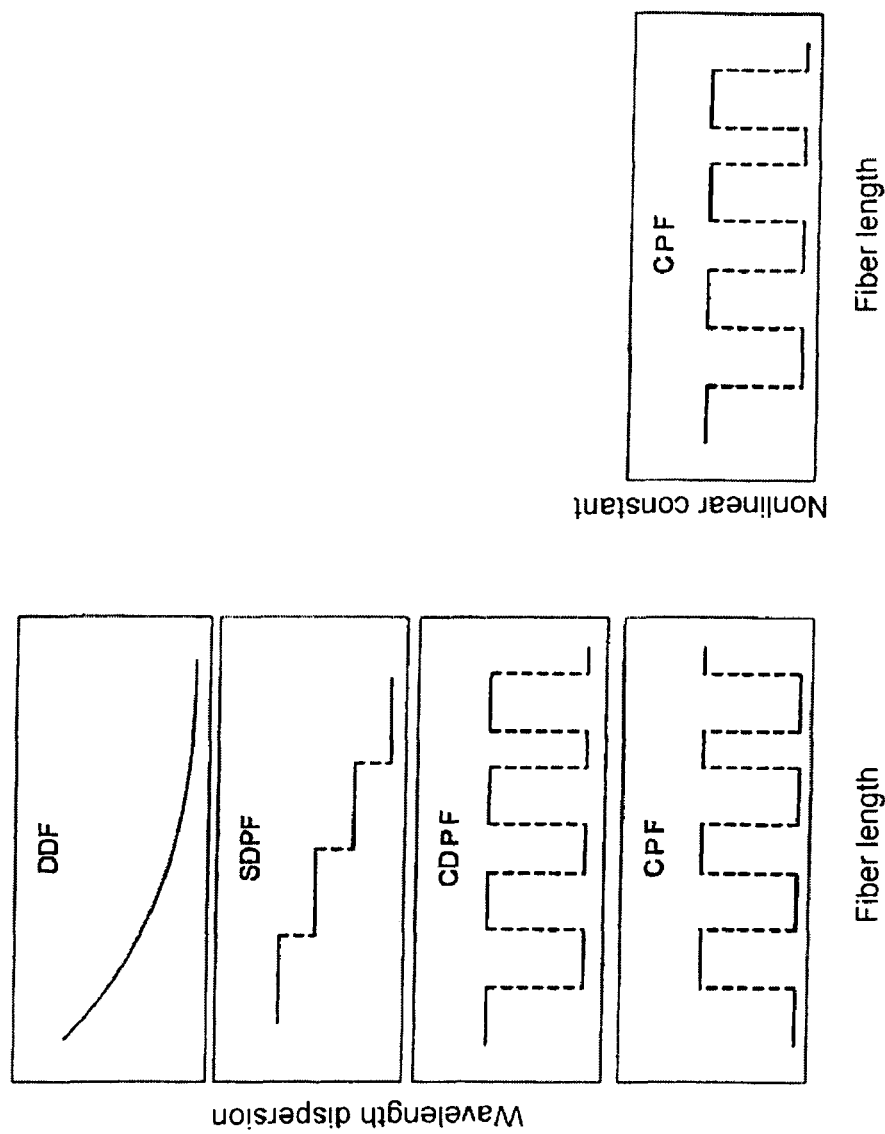
FIG. 12 is a view of an optical fiber used in a compressor 13.
Figure 13:
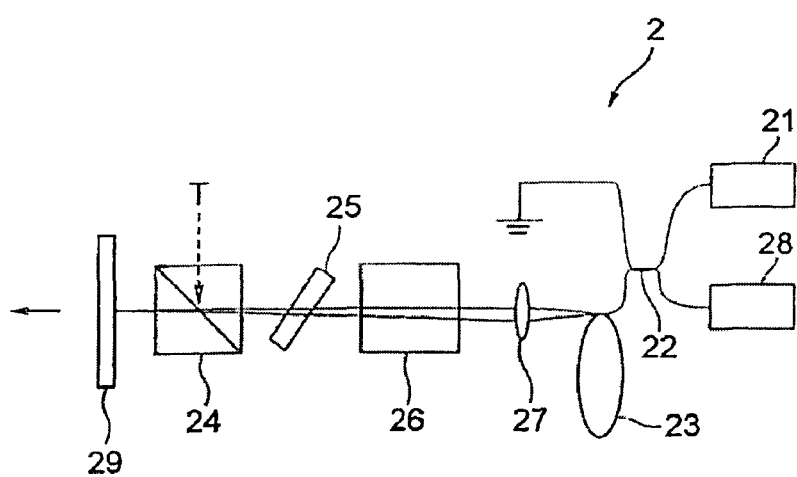
FIG. 13 is a view conceptually illustrating a structure of a mode locked ultra-short pulse generator.

Here, the above-described structure has all first type steps followed by second type steps. However, the second type steps may be provided before the all first type steps as shown in FIG. 10, or may be provided between first type steps or alternately. Further, as the optical compressor according to the third embodiment of the present invention is configured of combination of an optical compressor according to the first embodiment of the present invention and an optical compressor according to the second embodiment of the present invention, it can have a structure of combination of CPF and CDPF or SDPF.

Figure 14:
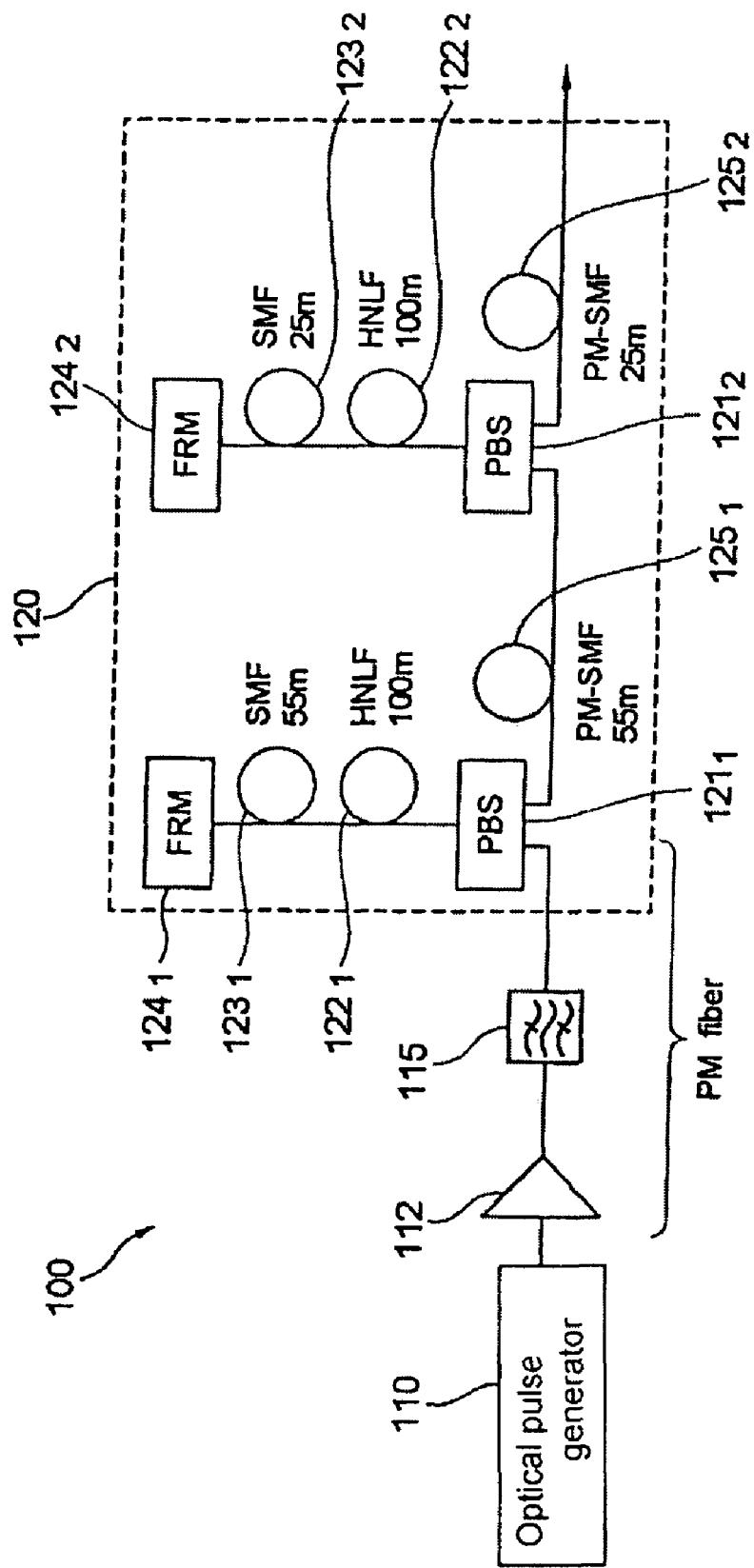
FIG. 14 is a view illustrating a structure of an ultra-short pulse light source according to a fourth embodiment of the present invention.

FIG. 14 is used to explain an ultra-short pulse light source according to a fourth embodiment of the present invention. The ultra-short pulse light source 100 according to the fourth embodiment of the present invention is almost the same as that of the first embodiment of the present invention. The ultra-short pulse light source 100 shown in FIG. 14 has an optical pulse generator 111, a polarization maintaining type optical amplifier 112 for amplifying pulse energy from the optical pulse generator 111, a polarization maintaining type band pass filter 115 for suppressing ASE (Amplified Spontaneous Emission) from the optical amplifier, and an optical compressor 120 for compressing optical pulses.

The pulse generator 111 is structured to generate optical pulses having a pulse width of 6.4 ps by gain switching a direct modulation Distributed Feedback-Laser Diode of PM optical fiber output by a 140-ps electrical pulse with 300 MHz repetition rate to generate optical pulses and subjecting the optical pulses to chirp compensation with a dispersion compensating fiber.

The optical compressor 120 is structured in the same way as that of the first embodiment of the present invention and detailed explanation thereof is omitted here. However, fiber lengths of each HNLF $122_1$, each SMF $123_1$, each PM-SMF $125_1$ are different from those of the first embodiment of the present invention. Specifically, the HNLF $122_1$ is 100 m long, the SMF $123_1$ is 55 m long, the PM-SMF $125_1$ is 55 m long, the HNLF $122_2$ is 100 m long, the SMF $123_2$ is 25 m long, and the PM-SMF $125_2$ is 25 m long.

Figure 15:
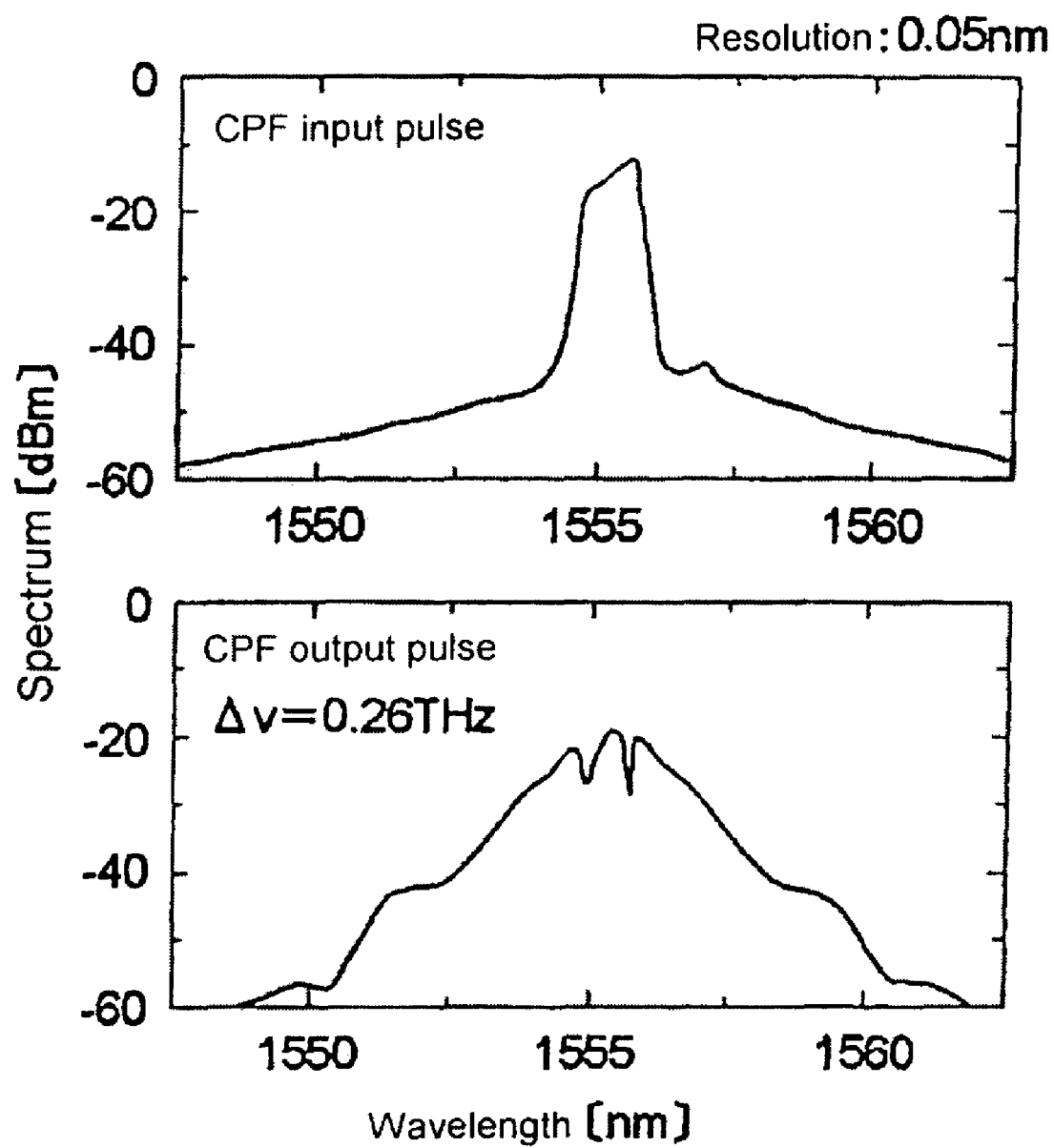
FIG. 15 is a view for explaining an example of spectrum of pulses input to/output from an optical compressor 120 in the ultra-short pulse light source 100 structured as shown in FIG. 14.

FIG. 15 is a view for explaining an example of spectrum profiles of pulses input to/output from the optical compressor 120 of FIG. 14. As seen from FIG. 15, the spectrum of pulse light output from the optical compressor 120 is widespread as compared with the spectrum of the pulse light input to the optical compressor 120.

Figure 16:
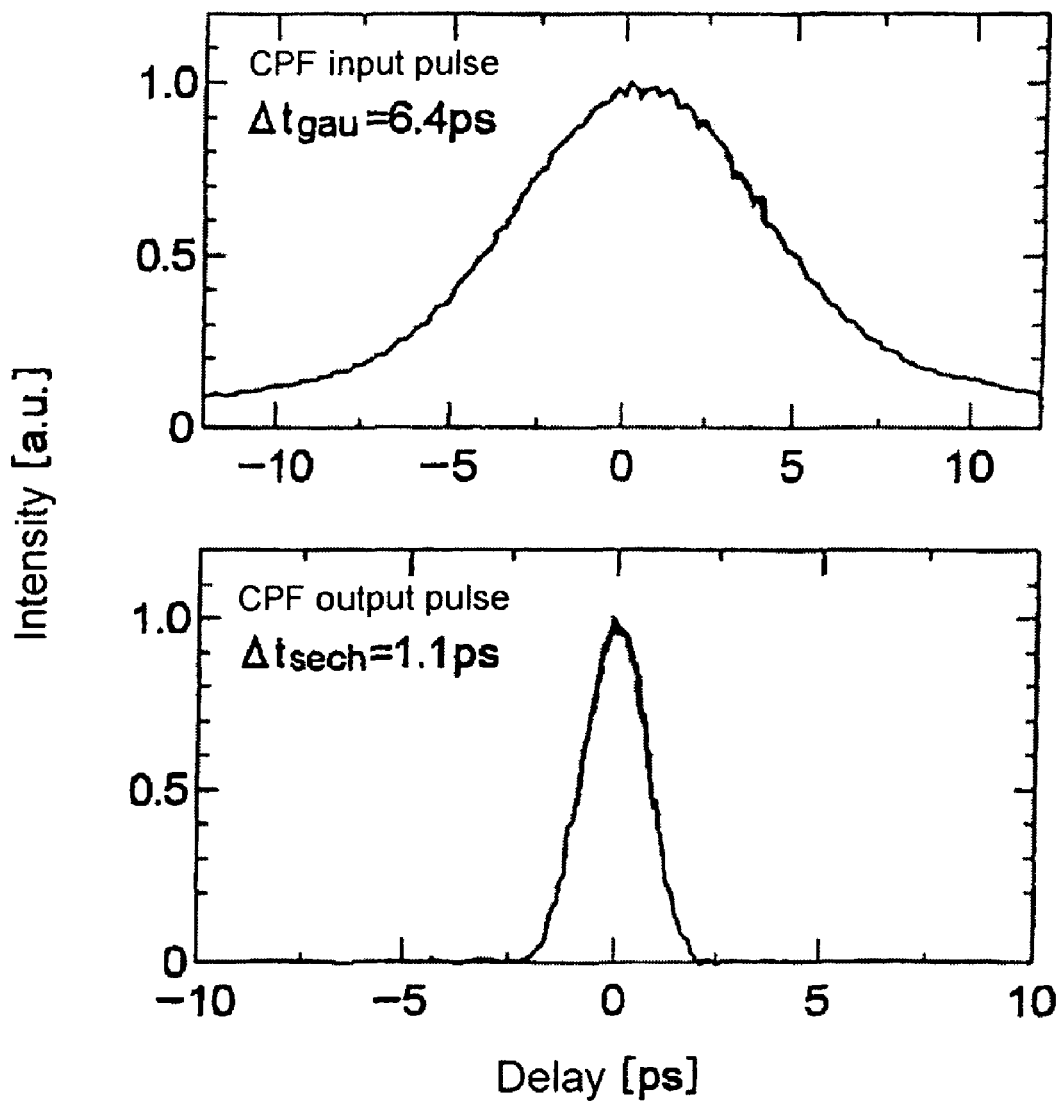
FIG. 16 is a view for explaining an autocorrelation trace of pulses input to/output from the optical compressor 120 in the ultra-short pulse light source 100 structured as shown in FIG. 14.

FIG. 16 is a view showing autocorrelation traces of pulses input to/output from the optical compressor 120 of FIG. 14. As seen from FIG. 16, input pulse light having a FWHM (Full Width Half Maximum) of 6.4 ps is compressed to light having a FWHM of 1.1 ps by the optical compressor 120. The time-bandwidth product of pulse light output from the optical compressor 120 is 0.29, which is close to the time-bandwidth product of 0.31 of transform-limited $sech^2$ pulses.

Figure 17:
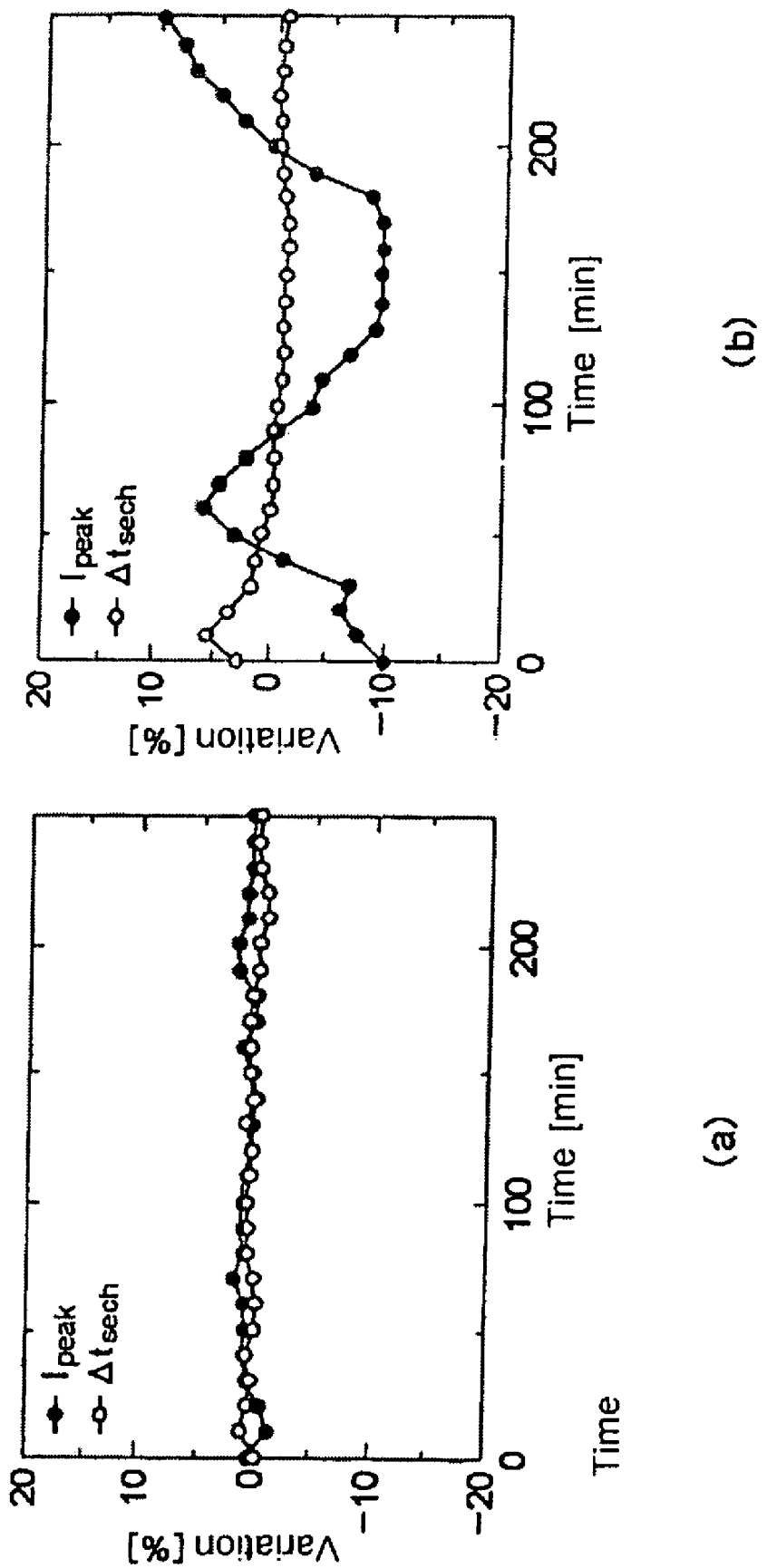
FIG. 17 is a view for comparing time dependency of the output characteristic of ultra-short pulses output from the optical compressor 120 in the ultra-short pulse light source 100 structured as shown in FIG. 14 with that of ultra-short pulses output from the conventional optical compressor.

FIG. 17(a) is a plot of varying peak intensity and pulse width of autocorrelation of pulses output from the ultra-short pulse light source 100 of FIG. 14 which was measured for 250 minutes at room temperatures, while FIG. 17(b) is a plot of varying peak intensity and pulse width of autocorrelation of pulses output from a conventional ultra-short pulse light source light source having a CPF compressor composed of four pairs of HNLF and SMF shown in the upper view of FIG. 4 used as the optical compressor 120 for comparison. As shown in FIG. 17(a), deviation of the peak intensity and pulse width of the autocorrelation trace of ultra-short pulse light source according to the fourth embodiment of the present invention is stable ±2% or better. In other words, as linear-polarized pulse light is maintained, the stable autocorrelation trace can be obtained. On the other hand, as shown in FIG. 17(b), polarization is not maintained in the conventional CPF, the autocorrelation trace shows large variation.

The optical compressor and the ultra-short pulse light source of this invention are advantageous in that they do not need connection between special optical fibers having polarization maintaining material, and are advantageously used as an optical compressor, an ultra-short pulse light source and the like utilized in optical communications, optical metrology, materials processing, physical properties measurement, biotechnology or the like.

The invention claimed is:
1. An optical compressor comprising at least one branch, the branch comprising:
an optical device, arranged in an optical path, to receive pulse light from a first direction in a first part of the optical path, to pass the received pulse light through the optical device and continue in the first direction of a second part of the optical path, to receive returned pulse light from a second direction in the second part of the optical path, the second direction opposing the first direction, and to output the returned pulse light into a different optical path;

an optical fiber of at least one kind, provided on the second part of the optical path, the optical fiber compressing the pulse light in the first direction and the second direction; and a polarization rotating element, provided on the second part of the optical path, the polarization rotating element rotating by 90 degrees a polarization direction of the pulse light received from the optical fiber in the first direction and returning the pulse light to the optical fiber in the second direction, wherein when said optical compressor comprises two or more branches, the branches are optically connected in series.

2. The optical compressor of claim 1, wherein the optical device is a beam splitter or a circulator.

3. The optical compressor of claim 1, further comprising:

a polarization maintaining optical fiber which maintains the polarization direction of the pulse light, the polarization maintaining optical fiber connected between an output of the optical device in the branch and an optical path in a second branch so that the branch is optically connected in series to the second branch via the polarization maintaining optical fiber.

4. The optical compressor of claim 3, wherein the polarization maintaining optical fiber is a single mode optical fiber capable of maintaining the polarization direction of the pulse light.

5. The optical compressor of claim 1, wherein the polarization rotating element is a mirror Faraday rotator having a reflecting mirror on a side opposite to a side where the pulse light is input.

6. The optical compressor of any one of claims 1 to 3, wherein the optical fiber of each of any of the at least one branch comprises a highly nonlinear optical fiber by which a spectrum of the pulse light is widespread with use of nonlinearity of optical characteristics.

7. The optical compressor of any one of claims 1 to 3, wherein the optical fiber of each of any of the at least one branch comprises a single mode optical fiber and the single mode optical fiber is used to compress the pulse light with use of wavelength dispersion.

8. The optical compressor of any one of claims 1 to 3, wherein the optical fiber of each of any of the at least one branch comprises a highly nonlinear optical fiber and a single mode optical fiber, the highly nonlinear optical fiber utilizes nonlinearity of optical characteristics to spread a spectrum of the pulse light and the single mode optical fiber utilizes wavelength dispersion to compress the pulse light.

9. The optical compressor of claim 8, wherein the pulse light propagates in the highly nonlinear optical fiber and the single mode optical fiber or a single mode optical fiber maintaining the polarization direction of the pulse light, alternately.

10. The optical compressor of any one of claims 1 to 3, wherein the optical fiber of each of any of the at least one branch comprises a single mode optical fiber, the pulse light propagates in the single mode optical fiber or a single mode optical fiber maintaining the polarization direction of the pulse light, alternately, and dispersion of the pulse light decreases in the path by approximation.

11. The optical compressor of any one of claims 1 to 3, wherein the optical fiber of each of any of the at least one branch comprises a single mode optical fiber and dispersion of the single mode optical fiber becomes smaller as the branch is closer to an output side.

12. An ultra-short pulse light source comprising:

an optical pulse source emitting pulse light; and the optical compressor as claimed in any one of claims 1 to 3.

13. The ultra-short pulse light source of claim 12, wherein the optical pulse source has an optical pulse generator for emitting short pulse light and an optical amplifier for amplifying the short pulse light emitted from the optical pulse generator.

14. The ultra-short pulse light source of claim 12, wherein the short pulse light emitted from the optical pulse generator is picosecond pulse light.

15. The ultra-short pulse light source of claim 13, wherein the short pulse light emitted from the optical pulse generator is picosecond pulse light.

* * * * *